(12) United States Patent
Bohling et al.

(10) Patent No.: US 10,858,531 B2
(45) Date of Patent: Dec. 8, 2020

(54) AQUEOUS DISPERSION OF KETO- AND PHOSPHORUS ACID MONOMER-FUNCTIONALIZED POLYMER PARTICLES

(71) Applicants: Dow Global Technologies LLC, Midland, MI (US); Rohm and Haas Company, Collegeville, PA (US)

(72) Inventors: James C. Bohling, Lansdale, PA (US); Pu Luo, King Of Prussia, PA (US); Qing Zhang, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 119 days.

(21) Appl. No.: 16/299,470

(22) Filed: Mar. 12, 2019

(65) Prior Publication Data

US 2019/0322889 A1 Oct. 24, 2019

Related U.S. Application Data

(60) Provisional application No. 62/659,354, filed on Apr. 18, 2018.

(51) Int. Cl.
| | | |
|---|---|---|
| *C09D 125/14* | (2006.01) | |
| *C09D 7/43* | (2018.01) | |
| *C09D 7/45* | (2018.01) | |
| *C09D 5/16* | (2006.01) | |

(52) U.S. Cl.
CPC ......... *C09D 125/14* (2013.01); *C09D 5/1668* (2013.01); *C09D 7/43* (2018.01); *C09D 7/45* (2018.01)

(58) Field of Classification Search
CPC ...... C09D 125/14; C09D 5/1668; C09D 7/43; C09D 7/45
USPC ....................................................... 524/501
See application file for complete search history.

(56) References Cited

U.S. PATENT DOCUMENTS

| | | |
|---|---|---|
| 5,348,997 A | 9/1994 | Kato et al. |
| 6,869,996 B1 | 3/2005 | Krajnik et al. |
| 2011/0177352 A1* | 7/2011 | Ambrose ............... C08F 220/58 428/458 |

* cited by examiner

*Primary Examiner* — Hui H Chin
(74) *Attorney, Agent, or Firm* — Reid S. Willis

(57) ABSTRACT

The present invention is related to a coating composition comprising a) an aqueous dispersion of acrylic or styrene-acrylic polymer particles functionalized with structural units of a monomer with keto functionality and structural units of a phosphorus acid monomer; b) a dispersant comprising structural units of a carboxylic acid monomer and a monomer with keto functionality; and c) a dihydrazide crosslinking agent. The composition of the present invention is useful for improving scrub resistance in a coating formed from the composition.

10 Claims, No Drawings

AQUEOUS DISPERSION OF KETO- AND PHOSPHORUS ACID MONOMER-FUNCTIONALIZED POLYMER PARTICLES

BACKGROUND OF THE INVENTION

Scrub resistance, which is the ability of a paint film to resist wearing or scrubbing, is a property of significant interest in the field of waterborne architectural coatings. The desire to achieve acceptable scrub resistance is offset by competing goals: the desire to lower emission levels in the manufacture of waterborne architectural paints as well as reducing volatile organic compound (VOC) exposure to consumers by replacing high $T_g$ latex polymer particles with low $T_g$ latex polymer particles (that is, polymer particles with a $T_g$ of less than 25° C.). The low $T_g$ latexes obviate the need for VOCs such as solvents and coalescents; on the other hand, high $T_g$ latexes offer inherently superior scrub resistance.

Accordingly, it would be desirable to develop a waterborne coatings composition that is free or substantially free of VOCs that gives coatings with excellent scrub resistance.

SUMMARY OF THE INVENTION

The present invention addresses a need in the art by providing a coating composition comprising a) an aqueous dispersion of acrylic or styrene-acrylic polymer particles functionalized with from 0.5 to 10 weight percent structural units of a monomer with keto functionality and from 0.05 to 5 weight percent structural units of a phosphorus acid monomer based on the weight of the polymer particles; b) from 0.1 to 5 weight percent of a dispersant, based on the dry weight of the composition, and having a $M_w$ in the range of from 500 to 50,000 Daltons and comprising from i) 5 to 90 weight percent structural units of a carboxylic acid monomer; and ii) from 0.5 to 10 weight percent structural units of a monomer with keto functionality; and c) a dihydrazide crosslinking agent; wherein the solids content of polymer particles is from 5 to 60 weight percent based on the weight of the composition.

The composition of the present invention addresses a need by providing a coating with low VOC and improved scrub resistance.

DETAILED DESCRIPTION OF THE INVENTION

The present invention is a composition comprising a coating composition comprising a) an aqueous dispersion of acrylic or styrene-acrylic polymer particles functionalized with from 0.5 to 10 weight percent structural units of a monomer with keto functionality and from 0.05 to 5 weight percent structural units of a phosphorus acid monomer based on the weight of the polymer particles; b) from 0.1 to 5 weight percent of a dispersant, based on the dry weight of the composition, and having a $M_w$ in the range of from 500 to 50,000 Daltons and comprising from i) 5 to 90 weight percent structural units of a carboxylic acid monomer; and ii) from 0.5 to 10 weight percent structural units of a monomer with keto functionality; and c) a dihydrazide crosslinking agent; wherein the solids content of polymer particles is from 5 to 60 weight percent based on the weight of the composition.

The polymer particles are acrylic or styrene-acrylic polymer particles which, by definition, comprises structural units of an acrylate monomer or a combination of a styrene and acrylate monomers. As used herein, an acrylate monomer refers to acrylates such as ethyl acrylate, butyl acrylate, and 2-ethyhexyl acrylate, as well as methacrylates such as methyl methacrylate and butyl methacrylate. Preferably, the polymer particles have a solids content in the range of from 5 to 40, more preferably to 20 weight percent, based on the weight of the composition. The polymer particles preferably have an average particle diameter in the range of 80 nm to 500 nm as measured by dynamic light scattering. In one aspect of the present invention the polymer particles have a $T_g$, as calculated by the Fox equation, of less than 25° C.

The polymer particles comprises structural units a monomer with keto functionality, that is, a monomer containing a keto or aldehyde group. Examples of monomers with keto functionality include acetoacetoxyethyl methacrylate (AAEM) and diacetone acrylamide (DAAM), preferably at a concentration in the range of from 1 to 5 weight percent, based on the weight of the polymer particles. DAAM is a preferred monomer with keto functionality.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkylmethacrylates and hydroxyalkylacrylates, including phosphoethyl methacrylate and phosphopropyl methacrylates, with phosphoethyl methacrylate being especially preferred. "Phosphoethyl methacrylate" (PEM) is used herein to refer to the following structure:

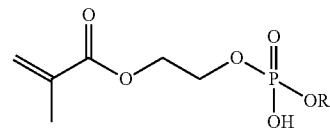

where R is H or

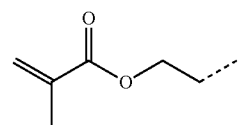

wherein the dotted line represents the point of attachment to the oxygen atom.

The dispersant preferably comprises from 10, more preferably from 20, more preferably from 30 weight percent, to 80, more preferably to 60, more preferably to 50, and most preferably to 40 weight percent structural units of a carboxylic acid monomer, based on the weight of the dispersant. Examples of suitable carboxylic acid monomers include acrylic acid, methacrylic acid, and itaconic acid.

The dispersant preferably optionally comprises one or more ancillary monomers, preferably in the range of from 10, more preferably from 30, more preferably from 40, and most preferably from 50, to 80, more preferably to 70 weight percent, based on the weight of the dispersant. Examples of suitable ancillary ethylenically unsaturated monomers include acrylates and methacrylates such as methyl methacrylate, ethyl acrylate, butyl acrylate, butyl methacrylate, 2-ethylhexyl acrylate, hydroxyethyl methacrylate, hydroxyethyl acrylate, and 2-hydroxypropyl acrylate. Butyl methacrylate is an example of a preferred ancillary ethylenically unsaturated monomer.

The dispersant preferably comprises from 1 to 5 weight percent structural units of DAAM, based on the weight of the dispersant. Optionally, the dispersant may comprise structural units of a phosphorus acid monomer, preferably PEM, preferably at a concentration in the range of from 0.05 to 5, more preferably to 2 weight percent, based on the weight of the dispersant.

The composition comprises a dihydrazide, examples of which include adipic acid dihydrazide (ADH), carbodihydrazide (CDH), sebacic acid dihydrazide (SDH), valine dihydrazide (VDH), isophthalic dihydrazide (ISODH), and icosanedioic hydrazide (ICODH). Preferably, the crosslinking agent is ADH. The mole-to-mole ratio of the dihydrazide to the structural units of the monomer with keto functionality present in the dispersant and the polymer particles is preferably in the range of from 0.2, more preferably from 0.3, and most preferably from 0.4, to preferably 2, more preferably to 1.5, more preferably to 1:1 and most preferably to 0.6:1.

Preferably, the weight average molecular weight ($M_w$) of the dispersant is in the range of from 1000 Daltons to preferably 25,000 Daltons, and more preferably to 10,000 Daltons, as measured by gel permeation chromatography measured versus polyacrylic acid standards.us The composition of the present invention is useful for all kinds of binders, and especially so for low $T_g$ binders (that is, latexes with a $T_g$ calculated by the Fox equation of <20° C.), which require lower concentrations of coalescents than latexes that do form a film at room temperature; the reduction of the use of coalescents result in a corresponding reduction in undesirable VOC levels. Accordingly, in another aspect, the present invention comprises less than 50 g/L VOCs.

The composition of the present invention advantageous includes one or more materials selected from the group consisting of extenders, defoamers, thickeners, coalescents, and pigments.

As used herein, the term "extenders" refer to inorganic materials that are used to increase the pigment volume concentration of the coating composition. Extenders are generally distinguished from pigments by their lower index of refraction (typically from 1.3 to 1.6) as compared to >2.0 for pigments. Examples of suitable extenders include, calcium carbonate, clays, aluminum silicates, silica, calcium silicates, mica, talc, and nephilene syenite.

In a preferred embodiment of the composition of the present invention, a sufficient amount of extenders or pigments and extenders is included to form a composition with an above-critical pigment volume concentration. Pigment volume concentration (PVC) is defined by the following formula:

$$PVC = \left[\frac{Vol(\text{Pigment} + \text{Extender})}{Vol(\text{Pigment} + \text{Extender} + \text{Binder Solids})}\right] \times 100$$

where binder solids refers to the contribution of polymer from the aqueous dispersion of the polymer particles that bind the pigment and extender particles together. The term "critical pigment volume concentration" (critical PVC) refers to the lowest concentration of polymer required to wet the surface of the pigment particles. Below critical PVC, polymer particles are present in excess relative to the pigments and extenders. As such, at PVCs at or below critical PVC, an adequate relative amount of binder volume to pigment and extender volume is present, leading to a substantially nonporous dry coating.

At a PVC above critical, the volume of binder is insufficient to coat all the pigment and extender to form a porous dry coating, resulting in a deterioration of the properties and performance of the subsequent coating. Consequently, abrasion resistance and stain resistance and removal are superior for coatings at or below critical PVC as compared to coatings above critical PVC. Nevertheless, the cost advantages of above-critical PVC paints sometimes outweigh the disadvantages of diminished properties. For this reason, it is desirable to develop an above-critical PVC composition that forms a coating with improved scrub resistance. In another embodiment, the composition of the present invention has a PVC above critical and in the range of from at least 55, more preferably at least 60, and most preferably at least 65, to 90.

Critical PVC of a coating is determined using reflectance (integrated sphere, spectral reflectance included, 10 degree observer/D65), as follows: The difference in reflectance of a coated film in the dry state is compared to the same film that has been rewetted with a penetrating solvent that has refractive index similar to that of the polymer (such as Isopar L solvent) that fills the air voids of the dry coating. When a coating is above critical PVC, the Y-reflectance of the rewetted coating will decrease by at least 2% from the initial Y-reflectance value of the dry coating.

ABBREVIATIONS

AA Acrylic acid
MAA Methacrylic acid
DAAM Diacetone acrylamide
MAA Methacrylic acid
BA Butyl acrylate
BMA Butyl Methacrylate
t-BHP tert-butyl hydroperoxide
EDTA Ethylenediaminetetraacetic acid
PEM Phosphoethyl methacrylate
IAA D-(−)-Isoascorbic acid
APS Ammonium persulfate
ADH Adipic acid dihydrazide
SSS Sodium styrene sulfonate
NaBS Sodium bisulfite
VTS Vinyltrimethoxy silane
HEC CELLOSIZE™ QP-4400H Hydroxyethyl cellulose
RM-2020 ACRYSOL™ RM-2020 NPR
RM-8W ACRYSOL™ RM-8W
MMP Methyl 3-mercaptopropionate

EXAMPLES

Intermediate Comparative Example 1—Preparation of a PEM-Functionalized Styrene-Acrylic Latex A monomer emulsion (ME) was prepared by mixing DI water (409.1 g), Polystep A16-22 surfactant (89.65 g), SSS (5.9 g), BA (682.6), styrene (891.5 g), AA (32.95 g), VTS (5.03 g), and PEM (4.03 g).

A 1-g reactor equipped with a mechanical stirrer, $N_2$ purge, thermometer, condenser, heating mantel, and temperature controller was charged with DI water (707.75 g) and heated to 85° C. Polystep A 16-22 surfactant (8.85 g) in water (20 g), a portion of the ME (54 g), a solution of iron sulfate (0.013 g) in water (12 g), a solution of EDTA (0.13 g) in water (12 g), and a solution of APS (5.8 g) in water (20 g).

After 5 min, with the reaction temperature controlled at 85° C., a solution of APS (2.34 g) in water (64 g) and a solution of NaBS (2.45 g) in water (64 g) were separately fed into the reactor at a rate of 0.74 g/min, and [the remainder of] the ME was fed was separately fed into the reactor at a rate of 10.4 g/min. After the feed additions were complete, the monomer emulsion vessel was rinsed with DI water (30 g), and the reactor was cooled to 55° C.

A solution of t-BHP (5.88 g, 70% aqueous solution) in water (40 g) and a solution of IAA (2.37 g) in water (40 g) were then added to the reactor, each at a rate of 1.8 g/min. After completion of the t-BHP and IAA feeds, the reactor was cooled to room temperature. When the reactor temperature reached 50° C., the pH of the contents of the reactor was adjusted to 8 by addition of $NH_4OH$. After was completed, the contents of the flask were filtered to remove gel. The filtered dispersion was found to have a measured particle size of 107 nm by dynamic light lattering.

Intermediate Comparative Example 2—Preparation of a DAAM-Functionalized Styrene-Acrylic Latex The preparation of a DAAM-functionalized styrene-acrylic binder was carried out substantially as described in Comparative Example 1 except as follows: the ME was prepared by mixing DI water (409.1 g), Polystep A16-22 surfactant (89.65 g), SSS (5.9 g), BA (666.46), styrene (875.36 g), AA (36.98 g), VTS (5.03 g), and DAAM (32.28 g); additionally, when the reactor temperature reached 50° C., ADH (16 g) in water (40 g) was added to the reactor after the pH adjustment step. The filtered dispersion was found to have a measured particle size of 106 nm.

Intermediate Comparative Example 3—Preparation of a Blend of PEM-Functionalized and DAAM-Functionalized Latexes The blend was prepared by mixing equal proportions of the latexes prepared as described in Comparative Examples 1 and 2.

Intermediate Example 1—Preparation of a DAAM-Functionalized Dispersant

An ME was prepared by mixing DI water (574.88 g), Aerosol A-102 surfactant (87.6 g), sodium acetate (4.67 g), BMA (906.93), MAA (558.32 g), MMP (38.48 g), and DAAM (45.52 g).

A 1-g reactor equipped with a mechanical stirrer, $N_2$ purge, thermometer, condenser, heating mantel, and temperature controller was charged with DI water (952.8 g) and heated to 85° C. Aerosol A-102 surfactant (9.68 g) in water (32 g), a portion of the ME (54 g) and a solution of NaPS (3.04 g) in water (24 g) were added to the reactor. Immediately after the addition, a solution of NaPS (2.48 g) in water (136 g) and the remainder of the ME were fed into the reactor, which was controlled at 83° C., at rates of 1.57 g/min, and 26.82 g/min, respectively. After the addition of the feeds were complete, the monomer emulsion vessel was rinsed with DI water (40 g), and the reactor is cooled to 75° C.

A solution of iron sulfate (0.028 g) in water (26 g) was then added to the reactor, followed by addition of a solution of t-BHP (0.84 g, 70% aqueous solution) in water (25 g) and a solution of IAA (0.42 g) in water (25 g), both at a rate of 1.3 g/min. After completion of all feeds, the reactor was cooled to room temperature. When the reactor temperature reached 50° C., $NH_4OH$ was added to adjust the pH of the latex to 7. After the reactor was cooled to room temperature, the contents were filtered to remove gel. The filtered dispersion was found to have a measured particle size of 135 nm and a solids contents of 21 weight percent.

Intermediate Comparative Example 4—Preparation of Dispersant without DAAM

A dispersant was prepared substantially as described for Intermediate Example 1 except that DAAM was not included in the ME.

Intermediate Example 2—Preparation of a PEM- and DAAM-Functionalized Styrene-Acrylic Latex The latex was prepared substantially as described in Comparative Example 2 except that the ME was prepared by mixing DI water (409.1 g), Polystep A16-22 surfactant (89.65 g), SSS (5.9 g), BA (666.46), styrene (875.36 g), AA (32.95 g), PEM (4.03 g), VTS (5.03 g), and DAAM (32.28 g). The filtered dispersion was found to have a measured particle size of 116 nm.

Example 1—Preparation of a 70 PVC Paint Formulation

A pigment grind was prepared by first adding the following ingredients into a grinding apparatus in sequence with low agitation: water, Intermediate 1 DAAM-Functionalized dispersant (DAAM-Dispersant), and Foamstar A-34 defoamer. Omyacarb 3 extender Cellosize QP-4400H thickener (HEC) were added slowly and the contents were ground for 20 min, followed by addition of ADH.

The latex of Intermediate Example 2 was added to the grind mixture under agitation, followed by the sequential addition of Texanol coalescent, ACRYSOL™ RM-2020 NPR thickener ACRYSOL™ RM-8W thickener. The paint was then mixed for 10 min and allowed to stand overnight prior to testing for scrub resistance. Table 1 summarizes the ingredients and amounts used to make the 70 PVC paint (latex solids content 42.33%)

TABLE 1

| 70 PVC Paint Formulation | |
|---|---|
| Name | Wt. (lbs) |
| Grind | |
| Water | 290.03 |
| DAAM-Dispersant | 31.73 |
| Foamstar A-34 Defoamer | 4.11 |
| Omyacarb 3 Extender | 667.74 |
| HEC | 1.89 |
| ADH | 0.20 |
| End Grind | 995.70 |
| LetDown | |
| Int. Ex. 2 Latex | 228.28 |
| Texanol Coalescent | 6.05 |
| RM-2020 | 22.22 |
| RM-8W | 4.73 |
| End LetDown | 261.28 |
| Totals | 1256.78 |

ISO Scrub Measurement

Scrub resistance tests were performed in accordance with ISO 11998. Drawdowns were made on black vinyl scrub charts with a 20-mil Dow applicator in a controlled temperature and humidity room and then dried for 7 d. The drawdown charts were weighed on an analytical balance before the scrub tests were carried out with a Pacific Scientific Abrasion Tester using 0.25% DS-4 as scrub media and Scotch Brite 7448 Ultra Fine Hand Pad as the scrub pad. Prior to the test, the scrub media was spread on the coating surface with a soft brush, and the scrub pad was saturated with the scrub media to a final total mass of 4 g. Each scrub test was run for 200 cycles. The scrubbed panel was rinsed with water immediately after the 200 cycles completed. The panel was allowed to dry overnight and then the weight of each chart was measured. The weight loss, dry density of the film, and the scrub area were then used to calculate the film thickness loss as:

Film loss=(Weight loss)/[(scrub area)×(film dry density)].

Table 2 summarizes the scrub film loss for the paint formulations

TABLE 2

Scrub Film Loss for Paint Formulations

| Latex | Latex Functionalization | | Dispersant w/o DAAM | | Dispersant w/ DAAM | |
|---|---|---|---|---|---|---|
| | PEM | DAAM/ADH | Film loss | stdev | Film loss | stdev |
| Comp. 1 | Y | N | 26.37 | 0.97 | 28.97 | 0.96 |
| Comp. 2 | N | Y | 26.79 | 0.56 | 26.55 | 0.78 |
| Example 1 | Y | Y | 26.82 | 0.48 | 23.37 | 0.45 |
| Comp. 3 | Y | Y | 30.42 | 0.68 | 31.30 | 0.22 |

The results show significantly improved scrub resistance for the Example 1 latex in the presence of the dispersant functionalized with DAAM. Surprisingly, the blend of a PEM functionalized latex and a DAAM functionalized latex (Comparative Example 3) gives significantly poorer scrub resistance as compared with any of the tested latexes.

The invention claimed is:

1. A coating composition comprising a) an aqueous dispersion of acrylic or styrene-acrylic polymer particles functionalized with from 0.5 to 10 weight percent structural units of a monomer with keto functionality and from 0.05 to 5 weight percent structural units of a phosphorus acid monomer based on the weight of the polymer particles; b) from 0.1 to 5 weight percent of a dispersant, based on the dry weight of the composition, and having a $M_w$ in the range of from 500 to 50,000 Daltons and comprising from i) 5 to 90 weight percent structural units of a carboxylic acid monomer; and ii) from 0.5 to 10 weight percent structural units of a monomer with keto functionality; and c) a dihydrazide crosslinking agent; wherein the solids content of polymer particles is from 5 to 60 weight percent based on the weight of the composition.

2. The composition of claim 1 wherein the dispersant comprises from 10 to 80 weight percent structural units of the carboxylic acid monomer, and further comprises, based on the weight of the dispersant, from 10 to 80 weight percent structural units of one or more ancillary monomer selected from the group consisting of methyl methacrylate, ethyl acrylate, butyl acrylate, butyl methacrylate, 2-ethylhexyl acrylate, hydroxyethyl methacrylate, hydroxyethyl acrylate, and 2-hydroxypropyl acrylate.

3. The composition of claim 1 wherein the mole-to-mole ratio of the dihydrazide to the structural units of the monomer with keto functionality present in the dispersant and the polymer particles is in the range of from 0.2:1 to 2:1.

4. The composition of claim 3 wherein the dihydrazide is adipic acid dihydrazide, the monomer with keto functionality is diacetone acrylamide, and the phosphorus acid monomer is phosphoethyl methacrylate, wherein the mole-to-mole ratio of adipic acid dihydrazide to the structural units of diacetone acrylamide present in the dispersant and the polymer particles is in the range of from 0.3:1 to 1.1:1.

5. The composition of claim 4 wherein the polymer particles have a $T_g$ of less than 25° C. and comprise structural units of styrene and butyl acrylate.

6. The composition of claim 5 wherein the dispersant has a $M_w$ in the range of from 1000 to 25,000 Dalton, wherein the dispersant comprises, based on the weight of the dispersant a) from 30 to 60 weight percent structural units of a carboxylic acid monomer; b) from 30 to 70 weight percent, structural units of butyl methacrylate; and from 1 to 5 weight percent structural units of diacetone acrylamide; wherein the carboxylic acid monomer is acrylic acid or methacrylic acid or a combination thereof.

7. The composition of claim 1 which further comprises one or more materials selected from the group consisting of extenders, defoamers, thickeners, coalescents, and pigments.

8. The composition of claim 7 which has an above-critical pigment volume concentration.

9. The composition of claim 8 which has a volatile organic compound (VOC) concentration of less than 50 g/L.

10. The composition of claim 1 wherein the dispersant further comprises from 0.05 to 5 weight percent structural units of phosphoethyl methacrylate.

* * * * *